Nov. 4, 1969 C. C. MAZUR 3,475,962
APPARATUS FOR MEASURING STRIP TEMPERATURE
Filed Sept. 7, 1967

INVENTOR.
CHESTER C. MAZUR
BY Donald G. Dalton
ATTORNEY.

3,475,962
APPARATUS FOR MEASURING STRIP TEMPERATURE
Chester C. Mazur, McKeesport, Pa., assignor to United States Steel Corporation, a corporation of Delaware
Filed Sept. 7, 1967, Ser. No. 666,193
Int. Cl. G01k 11/00
U.S. Cl. 73—355     1 Claim

ABSTRACT OF THE DISCLOSURE

When the temperature of a strip traveling through a heating chamber is measured with a particular type of pyrometer, an error results because the distance between the strip and pyrometer varies. Invention compensates by using two identical pyrometers on opposite sides of the strip and averaging their outputs.

---

This invention relates to an improved method and apparatus for measuring the temperature of a strip as it travels through a heating chamber.

A conventional method of measuring the temperature of a strip traveling through a heating chamber is to sense the temperature with a radiation pyrometer and connect the pyrometer to a recorder which continuously records the output. One source of error is that the strip may reflect radiation from the chamber walls and cause the pyrometer to give a reading which is too high or too low. One means of preventing this error is to use a pyrometer equipped with a hemispherical reflector which has a small window at its apex. The reflector is placed extremely close to the strip surface, commonly not more than ⅛ inch away. Examples of pyrometers of this type are shown in Land British Patents Nos. 621,882 and 681,835. For measuring temperatures in the range of about 400° to 800° F., I prefer a pyrometer which has a gold-plated reflector and a fluorite window. Such a pyrometer is available commercially through the Electro-Nite Company, Philadelphia, Pa., as the "Land Type CST."

A strip may waver slightly as it travels, and the distance between its surface and the pyrometer may vary a fraction of an inch or so. With pyrometers of the aforementioned type, variations in the distance cause inaccuracies in the temperature measurement. If the strip surface is closer than intended to the pyrometer, the voltage output of the pyrometer is too high; if farther than intended, the output is too low. Thus the resulting temperature reading is either higher or lower than the actual temperature. An example of an operation in which it is important to control the temperature accurately is a vapor-deposition process for coating metal strip. My invention is particularly useful in this type of operation, but it may be used in numerous other operations as long as both surfaces of the strip have the same emissivity.

An object of my invention is to provide an improved temperature-measuring method and apparatus which automatically compensate for variations in the distance between the surface of a moving strip and a pyrometer, thereby affording greater accuracy.

A more specific object is to provide a method and apparatus of the foregoing type in which I utilize two pyrometers at opposite sides of the strip and average their outputs to obtain a temperature measurement.

Figure 1:
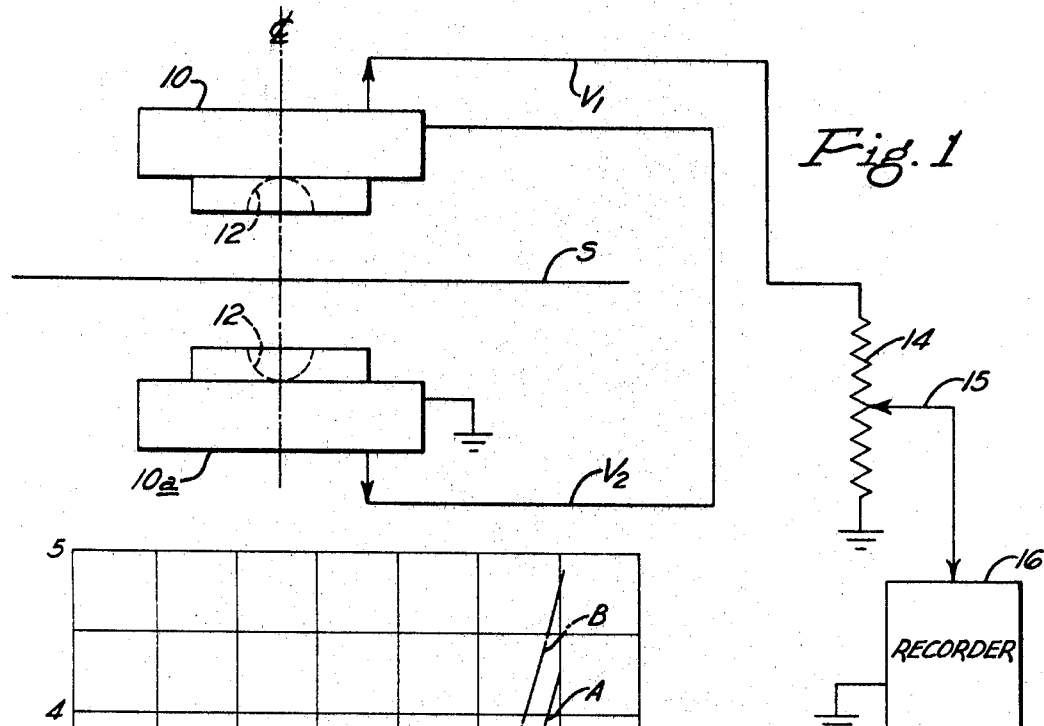
FIGURE 1 is a schematic representation of my apparatus.

FIGURE 1 shows a strip S which moves continuously, usually in the same direction. The position of the strip may vary slightly from its intended path because of vibrations, wrinkles in its surface, or other factors difficult to control. The strip is at an elevated temperature in the range which can be measured with a radiation pyrometer, and its upper and lower surfaces have the same emissivity.

In accordance with my invention, I position two radiation pyrometers 10 and 10a on opposite sides of strip S on a common center line. These pyrometers have hemispherical reflectors 12 and are placed extremely close to the strip surfaces. As long as the strip remains in its intended path, the two pyrometers are at equal distances from the strip surfaces. I connect the two pyrometers in series, whereby their output voltages $V1$ and $V2$ are added. I apply the combined voltage to one end of a linear slidewire 14, which has a cooperating arm 15. I set the arm 15 to the mid point of the slidewire, whereby the arm picks off a voltage equal to half the sum of the output voltages $V1$ and $V2$. I connect arm 15 to a recorder 16, which continuously records the temperature as an average of the two output voltages. The pyrometers and recorder are standard instruments available commercially; hence I have not shown them in detail. The pyrometer may be the aforementioned "Land Type CST." One example of a suitable recorder is the "Electronik 18" manufactured by Honeywell, Inc., Philadelphia, Pa.

Figure 2:
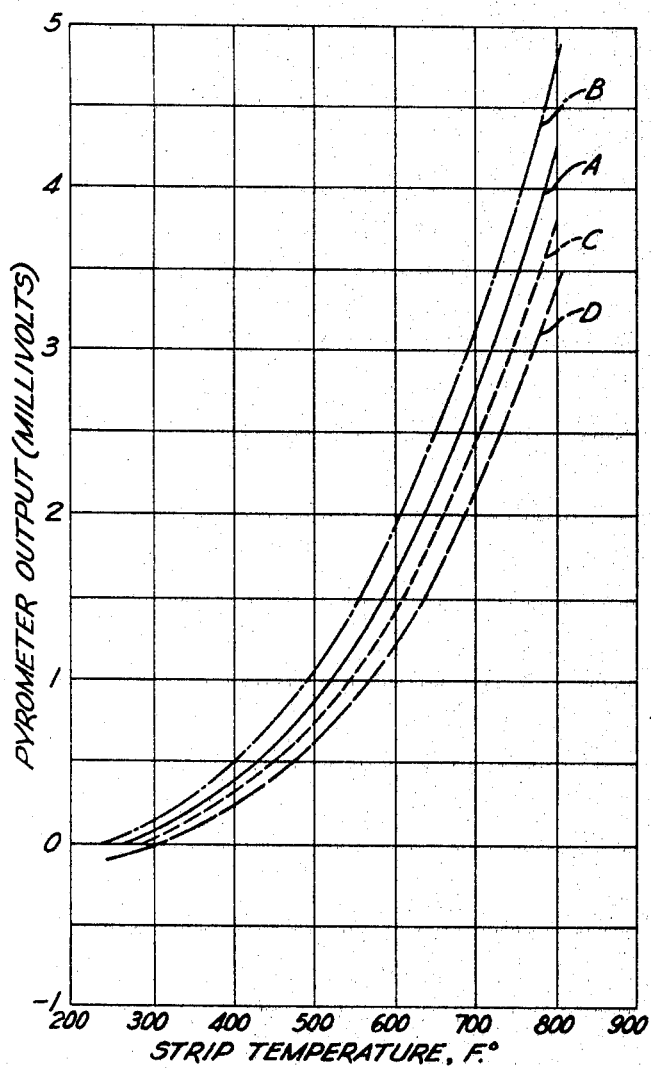
FIGURE 2 is a graph illustrating the principles involved.

The curves of FIGURE 2 serve to illustrate more clearly the operation of my invention. In these curves I assume that the distance between each pyrometer and the strip surface is intended to be ⅛ inch. Curve A shows how the voltage output of each pyrometer varies with the strip temperature as long as this distance does not change. Curves B, C and D show how the voltage output varies with the strip temperature when the distance becomes 1/16 inch, 3/16 inch and ¼ inch respectively. If the strip temperature is 500° F., curve A shows the output from each pyrometer is about 0.875 millivolt. If the distance diminishes to 1/16 inch, curve B shows the output increases to about 1.075 millivolts. The temperature indicated on the recorder is about 531° F. If the distance increases to 3/16 inch, curve C shows the output diminishes to about 0.75 millivolt. The temperature indicated on the recorder is about 480° F.

When my invention is employed, as long as the distance to each pyrometer remains ⅛ inch, the output from each is 0.875 millivolt as before. The sum of the voltages at the input end of the slidewire 14 is 1.750 millivolts, and the voltage reaching the recorder is half this value or 0.875 millivolt. If the distance to one pyrometer diminishes to 1/16 inch, the distance to the other increases to 3/16 inch. Under these conditions the outputs are 1.075 and 0.75 millivolt respectively. The sum of the voltages at the end of the slidwire is 1.825 millivolts, and the voltage reaching the recorder is 0.91 millivolt. The recorder indicates a temperature of 507° F., which is much closer to the true temperature than either pyrometer alone can measure.

From the foregoing description it is seen that my invention affords a simple method and apparatus for improving the accuracy of a temperature measurement obtained with radiation pyrometers on a moving strip. The curves shown in FIGURE 2 and the numerical values stated in the example are not intended to be limiting, but only serve to illustrate the principles of the invention.

While I have shown and described only a single embodiment of my invention, it is apparent that modifications may arise.

I claim:

1. An apparatus for measuring the temperature of a moving strip which is at an elevated temperature and both surfaces of which have the same emissivity, said apparatus comprising two radiation pyrometers connected in series and placed at opposite sides of the strip on a common center line, said pyrometers being of the type which includes hemispherical reflectors placed close to the strip surfaces, the intended distances between each pyrometer and the strip surfaces being equal, a potentiometer in series with said pyrometers, and a recorder connected between the slidable contact of the potentiometer and one end thereof, the slidable contact of the potentiometer being located substantially midway along the potentiometer, so that the voltage across the potentiometer is the sum of the output voltages of said pyrometers and the voltage across the recorder is one-half of said sum.

References Cited

UNITED STATES PATENTS 2,199,082  4/1940  Peters _____ 73—355
2,785,860  3/1957  Harrison et al. ____ 73—355 XR LOUIS R. PRINCE, Primary Examiner F. SHOON, Assistant Examiner